United States Patent [19]
Feldhaus

[11] Patent Number: 5,758,861
[45] Date of Patent: Jun. 2, 1998

[54] COMPRESSION MOUNT FOR EQUIPMENT

[75] Inventor: Thomas Daniel Feldhaus, Poquoson, Va.

[73] Assignee: Newport News Shipbuilding and Dry Dock Company, Newport News, Va.

[21] Appl. No.: 710,457

[22] Filed: Sep. 18, 1996

[51] Int. Cl.[6] ................................................ F16M 1/00
[52] U.S. Cl. .................. 248/638; 248/583; 248/632; 267/140.5; 267/141.1; 267/141.3
[58] Field of Search ........................ 248/638, 635, 248/634, 632, 613, 580, 581, 583; 267/140.5, 141, 141.1, 141.3, 141.6, 141.7, 140, 140.2, 134, 201, 205, 150, 214

[56] References Cited

U.S. PATENT DOCUMENTS

| | | |
|---|---|---|
| 2,306,392 | 12/1942 | Light .................................. 267/201 |
| 2,510,979 | 6/1950 | Ivanovic ........................... 267/141.7 |
| 2,819,060 | 1/1958 | Neidhart ....................... 267/141.1 X |
| 5,429,338 | 7/1995 | Runge et al. ...................... 248/583 |

FOREIGN PATENT DOCUMENTS

| | | | |
|---|---|---|---|
| 823517 | 1/1938 | France ............................. 267/141.3 |
| 829524 | 6/1938 | France ............................. 267/141.1 |
| 586608 | 3/1947 | United Kingdom ............... 267/141.3 |

*Primary Examiner*—Ramon O. Ramirez
*Assistant Examiner*—Stephen S. Wentsler
*Attorney, Agent, or Firm*—Lalos & Keegan

[57] ABSTRACT

An apparatus (10) for mounting equipment (12) to a foundation (14) and for isolating the equipment from shock loads and acoustic vibrations comprises an outer retaining member (16) secured to the equipment, an intermediate retaining member (18) secured to the foundation and an inner retaining member (20) secured to the equipment. A first resilient member (22) is secured in position for sliding contact with an inner surface (86) of the outer retaining member during static loading, axial loading causing movement of the foundation and/or equipment toward the other or transverse loading, whereby the first resilient member is loaded predominately in compression. A second resilient member (24) is secured in position for sliding contact with an inner surface (96) of the intermediate retaining member during axial loading causing movement of the foundation and/or equipment away from each other or transverse loading, whereby the second resilient member is loaded predominately in compression.

19 Claims, 1 Drawing Sheet

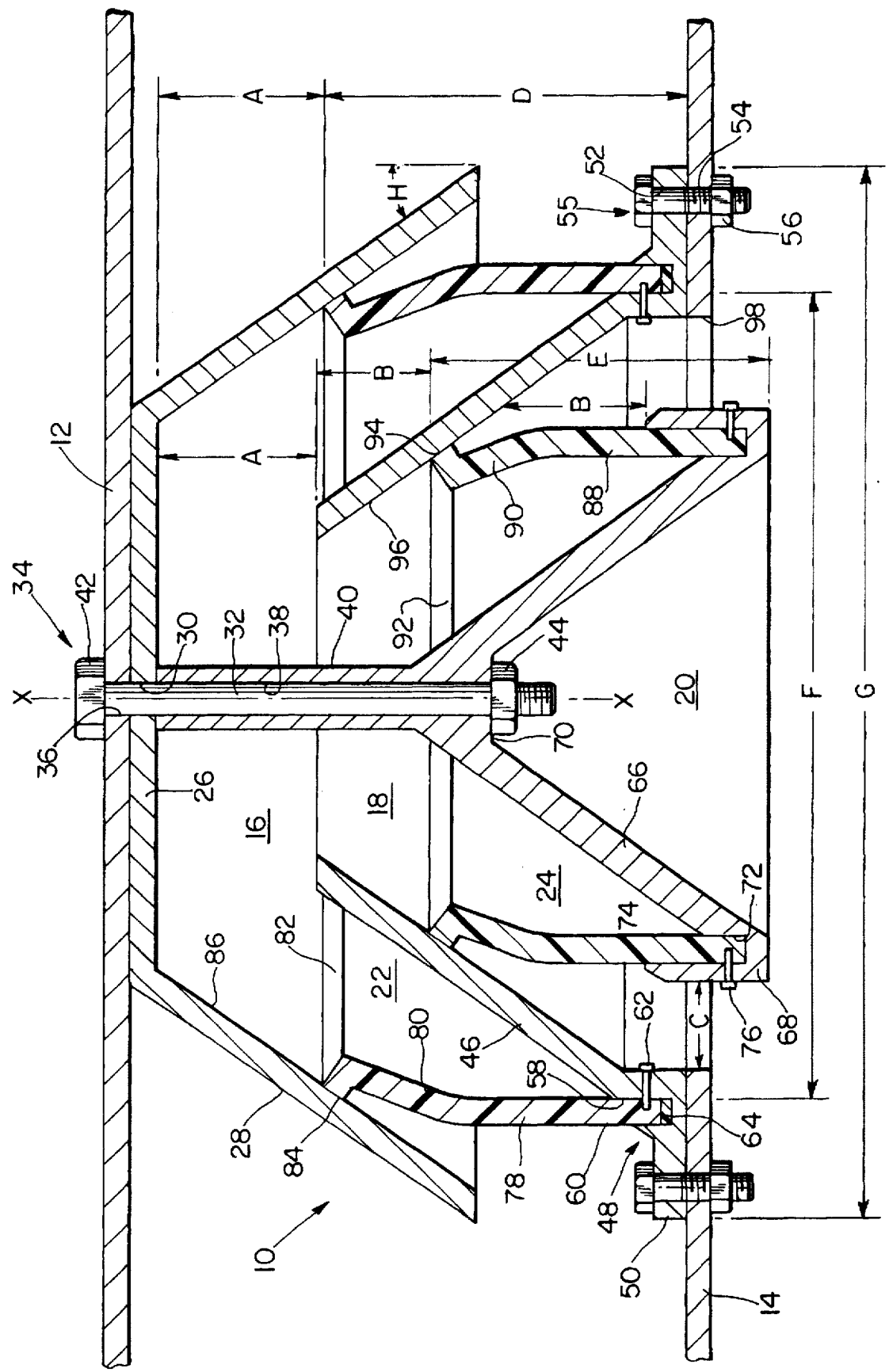

5,758,861

1

COMPRESSION MOUNT FOR EQUIPMENT

FIELD OF THE INVENTION

The present invention is related to mounting systems for isolating equipment from shock loads and for limiting the transmission of acoustic vibrations from the equipment to the foundation on which the equipment is installed.

BACKGROUND OF THE INVENTION

Shipboard equipment and equipment platforms are usually installed on resilient mounts to attenuate vibrations. Typically, a large capacity mount will comprise three elements: a compression element, a shear element and a shock snubber. The compression element provides isolation in the axial direction, the shear element provides isolation in the transverse direction and the shock snubbers physically limit the displacement excursion of the equipment under shock but do not provide any shock attenuation. The equipment installed on such mounts must be designed to withstand large shock accelerations since the mounts themselves are incapable of attenuating shock loads, such as experienced during battle.

A solution to such problem has been proposed in U.S. Pat. No. 5,429,338 issued to Runge et al. and assigned to the same assignee as is the present invention. U.S. Pat. No. 5,429,338 is incorporated in its entirety herein by reference. The equipment mount of the '338 patent comprises three basic components: a base mounted to a foundation, a generally cylindrical retainer including a flange to which the equipment is mounted, and a generally cylindrical resilient member disposed between the base and the retainer. The resilient member and its retainer are shaped and dimensioned to provide shock isolation over a large displacement range, e.g. 1 to 3 inches, regardless of the direction of the shock. The mount provides a change in stiffness as a function of the displacement amplitude. At smaller amplitude vibrations, the mount provides a first lower stiffness to attenuate small amplitude vibrations during normal conditions. The stiffness increases when a large excursion occurs under shock conditions during which the mount is displaced by an abnormal amount.

The resilient member disclosed in the '338 patent is made of a thermoplastic polyester elastomer, preferably an elastomer sold by E. I. Dupont de Nemours under the trademark HYTREL. The physical configuration of the mount in the '338 patent results in the resilient member being loaded predominately in tension and it has been found that a thermoplastic polyester elastomer such as HYTREL has poor creep characteristics when statically loaded in tension. These poor creep characteristics result in large static deflections when the resilient member is loaded over a period of time and such deflections are exacerbated by higher tension strain levels and elevated temperatures. Also, thermoplastic polyester polymers such as HYTREL are subject to internal imperfections when cast in large thicknesses for large equipment mounts. Such imperfections can result in catastrophic tearing failure when the resilient member is subjected to large tension strains during shock loading.

In addition, in the '338 patent the mount is installed in a circular hole in either the foundation or equipment and in order to withdraw the mount from the hole sufficient clearance must be available above or below the mount or the equipment must be removed, thereby adding to the time and expense of mount replacement or repair.

SUMMARY OF THE INVENTION

The present invention overcomes certain disadvantages of the prior art by providing an equipment mount that causes the resilient member, made preferably of a thermoplastic polyester elastomer such as HYTREL, to be loaded predominately in compression since it has been found that such material has better creep characteristics when loaded in compression than when loaded in tension.

The compression mount of the present invention includes a generally cup-shaped outer retainer with the base of the outer retainer secured to the equipment. A first resilient member that is generally bell-shaped is rigidly secured relative to the foundation and positioned so that an upper annular surface slides against the inside of the conical wall of the outer retainer. During static loading, vertical (axial) shock loading causing movement of the foundation and/or equipment toward one another, or transverse shock loading, the first resilient member slides against the interior of the conical wall of the outer retainer and is loaded predominately in compression. This minimizes creep deflection by causing the highest strain in the resilient member to be in compression rather than in tension, which provides longer service life and makes possible higher temperature applications.

The compression mount of the present invention further includes a generally cup-shaped intermediate retainer having an annular lip that is secured to the foundation and which includes an annular channel for holding the first resilient member and for rigidly securing it relative to the foundation in position for sliding contact with the outer retainer conical wall. A second resilient member that is generally bell-shaped is rigidly secured relative to the equipment and positioned so that its upper annular surface slides against the inside of the conical wall of the intermediate retainer. The compression mount of the present invention further includes an inside retainer that is generally stemmed-glass-shaped and is secured to the equipment at its base end and includes a channeled annular lip at its opposite end for holding the second resilient member and rigidly securing it relative to the equipment in position for sliding contact with the intermediate retainer conical wall. During vertical (axial) shock loading causing movement of the foundation and/or equipment away from one another or transverse shock loading, the second resilient member slides against the conical wall of the intermediate retainer and is loaded predominately in compression. This again minimizes creep deflection by causing the highest strain in the second resilient member to be in compression rather than in tension.

The retainers and resilient members are sandwiched between a lower surface of the equipment or equipment platform and an upper surface of the foundation so that when the mount is unbolted from the equipment and foundation and is unloaded it can slide laterally therebetween and be removed and/or replaced with the equipment in place.

BRIEF DESCRIPTION OF THE DRAWINGS

The FIGURE is a vertical cross-sectional view of the compression mount of the present invention.

DETAILED DESCRIPTION

The FIGURE shows the compression mount 10 of the present invention comprising five basic components—three retaining members and two resilient members. Outer retaining member 16 and intermediate retaining member 18 as shown are each generally cup-shaped whereas inner retaining member 20 is generally stemmed-glass-shaped. First resilient member 22 and second resilient member 24 each have a truncated-bell shape in the preferred embodiment shown. Other shapes for the mount components (e.g. oval, square or rectangular) are possible as long as they are configured so that the resilient members are loaded predominately in compression. In the preferred embodiment shown, all components are axisymmetric and coaxial with the vertical axis X—X. The resilient members 22 and 24 derive their stiffness from compression in the hoop direction and their axisymmetric shape simplifies their design by permitting use of axisymmetric finite element models to predict their load-deflection characteristics for each particular application of the present invention.

Outer retaining member 16 includes a base 26 and a conical wall 28 and has a central hole 30 for receiving shaft 32 of bolt 34. Shaft 32 also passes through hole 36 in the equipment or equipment platform 12 and longitudinal hole 38 in stem 40 of inner retaining member 20. Bolt 34 with head 42 and nut 44 threaded onto bolt 34 thereby rigidly secure both the outer and inner retaining members to the equipment 12.

Intermediate retaining member 18 includes a conical wall 46 and an annular lip 48. Lip 48 includes an annular flange 50 with a number of circumferentially spaced holes 52 that are aligned with a respective number of circumferentially spaced holes 54 in foundation 14. A respective number of bolts 55 are received in holes 52 and 54 and together with nuts 56 threaded thereon rigidly secure intermediate retaining member 18 to the foundation 14. Lip 48 also includes an annular channel 58 that receives and holds a lower end 60 of first resilient member 22 thereby rigidly securing member 22 to the foundation 14. In some applications of the present invention additional security is provided by machine screws 62 for preventing separation between resilient member 22 and intermediate retaining member 18. Preferably, a soft (relative to the resilient member 22) ring 64 is placed in channel 58 beneath member 22 to provide greater flexibility to the mount 10 under static load and to accommodate small deflections experienced during acoustic vibration. Soft ring 64 is preferably made of a synthetic elastomer such as neoprene, for example.

Inner retaining member 20 includes a longitudinal stem 40 and a conical wall 66 terminating in an annular flange 68. Stem 40 includes a through-hole 38 for receiving shaft 32 of bolt 34 and also includes a circular, flat landing 70 onto which nut 44 is tightened to secure member 20 to the equipment 12. Flange 68 includes an annular channel 72 that receives and holds a lower end 74 of second resilient member 24 thereby rigidly securing member 24 to the equipment 12. Again, in some applications of the present invention, additional security is provided by machine screws 76 for preventing separation between resilient member 24 and inner retaining member 20. Outer retaining member 16, intermediate retaining member 18 and inner retaining member 20 may be made of any suitable material such as cast nickel-aluminum-bronze, for example.

Resilient members 22 and 24 are similar in shape but differ in height and diameter. Each has a generally truncated bell-shape. First resilient member 22 includes a lower wall portion 78 that is generally parallel to but may be sloped relative to the central axis X—X, an upper wall portion 80 that is inclined relative to the lower wall portion 78 and central axis X—X, and an annular lip 82 that includes a sloped contact surface 84 that is inclined relative to the lower wall portion 78 and central axis X—X at a greater angle than the upper wall portion 80.

During static loading, vertical (axial) shock loading causing movement of the foundation and/or equipment toward one another or transverse shock loading, contact surface 84 of first resilient member 22 slides against the inside surface 86 of conical wall 28 of the first retainer member 16 and the resilient member is loaded predominately in compression. The angled relationship between the lower wall portion 78 and upper wall portion 80 gives a bi-linear stiffness to resilient member 22. The annular lip 82 with sloped contact surface 84 together with the upper wall portion 80 produce a well defined low stiffness in the static load range. The lower wall portion 78 provides increased stiffness after an initial shock load is applied and such stiffness remains approximately constant through the remaining shock excursion. The exact value of stiffness through the static and shock load handling portions of the resilient member can be selected for each particular application of the present invention by varying the thicknesses and lengths of the resilient member portions, the angle between portions 78 and 80, the contact angle and the angle of conical wall 28. Selection of parameters for particular applications can be made through mathematical analysis or computer modeling using axisymmetric finite element models, for example, as are well known in the art.

Similar to first resilient member 22, second resilient member 24 includes a lower wall portion 88 that is generally parallel to, but may be sloped relative to the central axis X—X, an upper wall portion 90 that is inclined relative to the lower wall portion 88 and central axis X—X, and an annular lip 92 that includes a sloped contact surface 94 that is inclined relative to the lower wall portion 88 and central axis X—X at a greater angle than the upper wall portion 90. During vertical (axial) shock loading causing movement of the foundation and/or equipment away from one another or during transverse shock loading, contact surface 94 of first resilient member 24 slides against the inside surface 96 of conical wall 46 of intermediate retaining member 18 and the resilient member is loaded predominately in compression. Again, the angled relationship between the straight wall portion 88 and the sloped wall portion 90 gives a bi-linear stiffness to resilient member 24. First and second resilient members 22 and 24 are preferably made of a thermoplastic polyester elastomer, preferably an elastomer sold by E.I. Dupont de Nemours under the trademark HYTREL, which has been found to have better creep characteristics when loaded in compression than when loaded in tension.

The dimensional relationships of the components of mount 10 are chosen to suit each particular application of the present invention and will be a function of mount capacity, shock severity, desired maximum equipment acceleration and maximum allowable equipment displacement. Each major dimension is labelled with a letter in the FIGURE (not to scale) with a specific example dimension shown in parentheses. These example dimensions are of a mount 10 that is rated to support a static load of 3 thousand pounds with a static deflection of 0.5 inches. Example mount 10 will deflect +/−2.5 inches under shock and isolate the supported equipment to no more than a 15 "g" acceleration exposure when subjected to a 100 inch/sec step velocity increase.

Dimension A is selected to be equal to or greater than the maximum vertical (axial) shock deflection with movement of the foundation and/or equipment toward one another plus the deflection of the mount under static load. Dimension B is selected to be equal to or greater than the maximum vertical (axial) shock deflection with movement of the foundation and/or equipment away from one another minus the deflection of the mount under static load. Dimension C is equal to or greater than the maximum lateral or transverse shock deflection of the mount. Dimension D is a function of the total height of first resilient member 22 required to maintain the desired vertical spring constant over the maximum vertical shock deflection with movement of the foundation and/or equipment toward one another plus the static load deflection.

Dimension E is a function of the total height of the second resilient member 24 required to maintain the desired vertical spring constant over the maximum vertical shock deflection with movement of the foundation and/or equipment away from one another minus the static load deflection. Dimension F is the diameter of the first resilient member 22, which is controlled by the maximum vertical shock deflection and maximum allowable material (e.g. HYTREL) strain when subjected to shock loading. Dimension G is the maximum diameter of the compression mount 10. Dimension H is the cone angle of the conical walls of the outside and intermediate retainers 16 and 18. This angle may be the same or different for each retainer depending on the application.

With the configuration of the mount 10 as shown and described, it can be removed from its position between the foundation and the equipment without removing the equipment. First, the mount 10 must be unloaded by lifting the equipment a short distance and supporting it in place with a jack, for example. Then, nut 44 is removed and bolt 34 withdrawn thereby allowing inner retaining member 20 and second resilient member 24 to be dropped down through hole 98 in equipment 14. Thereafter, bolts 55 are removed to release inner retaining member 18 from the foundation and the balance of the mount including inner retaining member 18, first resilient member 22 and outer retaining member 16 can be withdrawn laterally from between the equipment and the foundation.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

I claim:

1. An apparatus (10) for mounting equipment (12) to a foundation (14) and for isolating said equipment from shock loads and acoustic vibrations comprising:

an outer retaining member (16) for securing said apparatus to said equipment;

an intermediate retaining member (18) for securing said apparatus to said foundation;

an inner retaining member (20) for securing to said equipment;

a first resilient member (22) secured in position for sliding contact with an inner surface (86) of said outer retaining member during static loading, axial and transverse loading causing movement of at least one of said foundation and equipment toward the other of said foundation and equipment, whereby said first resilient member is loaded predominately in compression;

a second resilient member (24) secured in position for sliding contact with an inner surface (96) of said intermediate retaining member during axial and transverse loading, whereby said second resilient member is loaded predominately in compression; and wherein said intermediate retaining member includes means for securing (58, 62) said first resilient member in position for sliding contact with said outer retaining member.

2. The apparatus as in claim 1 wherein said means for securing said first resilient member in position for sliding contact with said outer retaining member includes an annular channel (58) for receiving a portion (60) of said first resilient member.

3. The apparatus as in claim 2 wherein said means for securing said first resilient member includes a means for attaching (62) said first resilient member to said intermediate retaining member.

4. The apparatus as in claim 3 wherein said means for attaching includes screws (62).

5. The apparatus as in claim 2 further including an annular ring (64) disposed in said channel.

6. The apparatus as in claim 5 wherein said annular ring is made of a synthetic elastomer.

7. The apparatus as in claim 6 wherein said annular ring is made of neoprene.

8. The apparatus as in claim 1 wherein said inner retaining member includes means for securing (72, 76) said second resilient member in position for sliding contact with said intermediate retaining member.

9. The apparatus as in claim 8 wherein said means for securing said second resilient member includes an annular channel (72) for receiving a portion (74) of said second resilient member.

10. The apparatus as in claim 9 wherein said means for securing said second resilient member includes a means for attaching (76) said second resilient member to said intermediate retaining member.

11. The apparatus as in claim 10 wherein said means for attaching includes screws (76).

12. The apparatus as in claim 1 wherein said first resilient member includes a lower wall portion (78) and an upper wall portion (80) that is inclined at a first angle relative to said lower wall portion thereby giving said first resilient member a bi-linear stiffness.

13. The apparatus as in claim 12 wherein said first resilient member further includes an annular lip (82) having a sloped contact surface (84) that is inclined at a second angle relative to said lower wall portion, such that said second angle is greater than said first angle.

14. The apparatus as in claim 1 wherein said first resilient member is generally truncated-bell-shaped.

15. The apparatus as in claim 2 wherein said first resilient member comprises a material composition having lower creep deflection for compression loading than for tension loading.

16. The apparatus as in claim 1 wherein said second resilient member includes a lower wall portion (88) and an upper wall portion (90) that is inclined at a first angle relative to said lower wall portion thereby giving said second resilient member a bi-linear stiffness.

17. The apparatus as in claim 16 wherein said second resilient member further includes an annular lip (92) having a sloped contact surface (94) that is inclined at a second angle relative to said lower wall portion, such that said second angle is greater than said first angle.

18. The apparatus as in claim 1 wherein said second resilient member is generally truncated-bell-shaped.

19. The apparatus as in claim 2 wherein said second resilient member comprises a material composition having lower creep deflection for compression loading than for tension loading.

* * * * *

UNITED STATES PATENT AND TRADEMARK OFFICE
CERTIFICATE OF CORRECTION

PATENT NO. : 5,758,861
DATED : June 2, 1998
INVENTOR(S) : Thomas D. Feldhaus

It is certified that error appears in the above-identified patent and that said Letters Patent is hereby corrected as shown below:

<u>Column 6</u>

In Claim 10, the third and fourth lines, "intermediate" should read -- inner --.

In Claim 15, first line, "Claim 2" should read -- Claim 1 --.

In Claim 19, first line, "Claim 2" should read -- Claim 1 --.

At the beginning of the specification, add the following as the first sentence:

-- This invention was made with Government support under Contract N00024-92-C-4207. The Government has certain rights in this invention. --

Signed and Sealed this

Twenty-fourth Day of November, 1998

BRUCE LEHMAN

*Attest:*

*Attesting Officer*  *Commissioner of Patents and Trademarks*